UNITED STATES PATENT OFFICE.

JOHN H. STEVENS, OF NEWARK, NEW JERSEY, ASSIGNOR TO THE CELLULOID MANUFACTURING COMPANY, OF NEW YORK, N. Y.

MANUFACTURE OF COMPOUNDS OF PYROXYLINE OR NITRO-CELLULOSE.

SPECIFICATION forming part of Letters Patent No. 269,344, dated December 19, 1882.

Application filed June 24, 1882. (No specimens.)

*To all whom it may concern:*

Be it known that I, JOHN H. STEVENS, of the city of Newark, in the county of Essex and State of New Jersey, have invented certain new and useful Improvements in the Manufacture of Compounds of Pyroxyline or Nitro-Cellulose, of which improvements the following is a specification.

Compounds of pyroxyline such as those to which my present invention relates are designed for use and application in various manufactures, such uses and applications being available by reason of the plasticity of the compound or its susceptibility of being molded into shapes or cut into sheets, or else by reason of its susceptibility of being seasoned or cured in masses, or in approximate forms which can be carved or turned like ivory.

The pyroxyline or nitro-cellulose employed in making these compounds is of the class or grade designated as "soluble," and it has heretofore been dissolved in various solvents—such as alcohol and ether, wood-naphtha, solutions of camphor, and numerous others, either simple or compound, other ingredients being incorporated with the nitro-cellulose and the solvent, as is well understood.

It is generally understood as the fact that while ether, alcohol, and camphor separately are not solvents of pyroxyline under ordinary conditions, yet a compound of ether and alcohol, or a solution of camphor in alcohol, is such a solvent, and such compounds or solutions are, like wood-naphtha and some other single substances, classed among what are termed "active solvents," or those which are solvents at the ordinary temperature. Again, there are certain substances which are not solvents of pyroxyline at the ordinary temperature, but which become such solvents when subjected to a high degree of heat, after being compounded or mechanically mixed with the nitro-cellulose—as, for example, camphor—and such are termed "latent solvents." The progress of the art has induced, as the general practice in the manufacture of these compounds, the combined use of both classes of solvents, active and latent, under modified conditions, and the best methods known to me are those in which a compound or mechanical mixture is made of nitro-cellulose and a non-solvent or a latent solvent, and, after due preparation, by incorporating the other desired ingredients with the nitro-cellulose compound or mixture, the final addition of a menstruum which, with the other ingredients, constitutes a solvent, either active or latent, and the treatment of the entire compound with heat in masticating-rolls or in dies, as is well understood. Thus, for example, to a compound of camphor and nitro-cellulose, the addition of alcohol in sufficient quantity will constitute an active solvent, or the addition of wood-naphtha will constitute an active solvent, the extent of the solvent action being, however, in either of these cases controlled or modified by proportioning the quantity of the menstruum added to the camphor and pyroxyline.

The almost infinite variety of uses or applications of the material have been found to demand a corresponding variation in the treatment of the ingredients, and relatively to these necessary variations the range of choice among liquid solvents or menstrua has been extremely limited, attention having been most generally directed to modifications of the treatment, rather than to the discovery of new solvents or menstrua.

It is, however, the object of my invention to extend the list of known useful solvents, and by a series of experiments to this end I have discovered that fusel-oil, (amylic alcohol,) while of itself not a solvent of nitro-cellulose, is an exceedingly useful ingredient of these compounds by reason of its properties, and that it can be added to the nitro-cellulose and other inert ingredients without any solvent action under ordinary conditions, and then the conversion of the nitro-cellulose may be completed by the addition of any of the hereinafter-specified substances, or by mixtures of any of them, with the effect of an active solvent, subject to control and treatment in all respects the same as those compounds in which camphor and alcohol or wood-naphtha have been heretofore employed. The best practice, in using these ingredients, is to add the fusel-oil to the nitro-cellulose, incorporating in this mixture the coloring-matter and other inert substances to be included in the product, and then to add the menstruum selected from those hereinafter enumerated. This mixture should be allowed to stand in a closed vessel for about twelve hours, and then it may be masticated in heated rolls in the usual manner. The product can be seasoned or cured and cut into shapes as desired, or, if not exposed too long, and before being thoroughly dried or cured, it can be pressed into shape in heated dies.

The proportions used should be about as follows, varying between the extremes given, according as the menstruum selected is less or more volatile, the more volatile menstrua, as the ether mentioned, requiring the larger proportion, and the less volatile menstrua, as the oils, requiring the smaller proportions: pyroxyline, four parts, by weight; fusel-oil, three to four parts, by weight; any one of the hereinafter-specified menstrua, or a mixture of any two or more of them, two to three parts, by weight. The menstrua referred to are the following: oil of hyssop, oil of sage, oil of tansy, oil of worm-seed, oil of fennel-seed, oil of cloves, light oil of cinnamon, oil of anise, oil of sassafras, oil of chamomile, oil of winter-green, oil of caraway-seed, oil of dill, acetal, nitrate of amyl, nitrite of amyl. These menstrua or mixtures of any of them will be found to constitute, with the fusel-oil, active solvents of the nitro-cellulose at ordinary temperatures.

While it is preferred to add the fusel-oil first, as above described, the other component of the solvent, or the menstrua specified, may be added first and the fusel-oil last, without any essential difference in the result.

If desirable, ethylic alcohol or wood-naphtha may be used in conjunction with the fusel-oil, and the above-specified menstrua or mixtures of the same in the proportion of—to four parts, by weight, of pyroxyline, five to six parts, by weight, of a mixture made by adding, as above described, three to four parts of fusel-oil, one to two parts of any one of the above-specified menstrua, or of mixtures of the same, and one to two parts of the ethylic alcohol or the methylic alcohol, (wood-naphtha.)

In using either the wood-spirit or the ethylic alcohol, it will be found advantageous to add it after all the other ingredients have been incorporated with the nitro-cellulose and fusel-oil and after the addition of the menstruum. In all cases the same treatment is applicable, and the product will have similar characteristics.

Having thus described the nature and objects of my invention, what I claim as new, and desire to secure by Letters Patent, is—

1. As an improvement in the art of manufacturing compounds of pyroxyline or nitro-cellulose, the employment of fusel-oil (amylic alcohol) in conjunction with the hereinbefore-specified menstrua, or mixtures of the same, substantially as described.

2. As an improvement in the manufacture of compounds of pyroxyline or nitro-cellulose, the employment of fusel-oil as a solvent or menstruum, substantially as described.

JOHN H. STEVENS.

Witnesses:
ABRAHAM MANNERS,
J. C. FORCE.